(12) United States Patent
Heath et al.

(10) Patent No.: US 8,532,459 B2
(45) Date of Patent: Sep. 10, 2013

(54) FAST CHANNEL CHANGE IN A DIGITAL TELEVISION RECEIVER

(75) Inventors: Robert Harry Heath, San Francisco, CA (US); James Edwin Hailey, Indianapolis, IN (US)

(73) Assignee: Thomson Licensing, Boulogne Billancourt (FR)

( * ) Notice: Subject to any disclaimer, the term of this patent is extended or adjusted under 35 U.S.C. 154(b) by 972 days.

(21) Appl. No.: 12/223,221

(22) PCT Filed: Jan. 27, 2006

(86) PCT No.: PCT/US2006/003187
§ 371 (c)(1),
(2), (4) Date: Jul. 24, 2008

(87) PCT Pub. No.: WO2007/086869
PCT Pub. Date: Aug. 2, 2007

(65) Prior Publication Data
US 2010/0183285 A1    Jul. 22, 2010

(51) Int. Cl.
*H04N 9/80*        (2006.01)
*H04N 7/26*        (2006.01)

(52) U.S. Cl.
USPC ............... 386/241; 386/E5.003; 386/E5.014; 725/38

(58) Field of Classification Search
None
See application file for complete search history.

(56) References Cited

U.S. PATENT DOCUMENTS

| | | | |
|---|---|---|---|
| 5,299,011 A | 3/1994 | Choi | |
| 5,345,274 A | 9/1994 | Matsunaga | |
| 5,933,192 A * | 8/1999 | Crosby et al. | 375/240.25 |
| 5,995,563 A | 11/1999 | Ben-Efraim et al. | |
| 6,118,498 A | 9/2000 | Reitmeier | |
| 6,163,112 A | 12/2000 | Ponard et al. | |
| 6,188,448 B1 | 2/2001 | Pauley et al. | |
| 6,334,217 B1 | 12/2001 | Kim | |
| 6,417,890 B1 | 7/2002 | Welles, II et al. | |
| 6,519,011 B1 * | 2/2003 | Shendar | 348/731 |

(Continued)

FOREIGN PATENT DOCUMENTS

| | | |
|---|---|---|
| CA | 2258823 | 7/1999 |
| EP | 1389874 | 2/2004 |

(Continued)

OTHER PUBLICATIONS

International Search Report, dated Sep. 15, 2006.

*Primary Examiner* — David García Cervetti
*Assistant Examiner* — Fatoumata Traore
(74) *Attorney, Agent, or Firm* — Robert D. Shedd; Kuniyuki Akiyama

(57) ABSTRACT

A multiple-tuner digital video storage device, providing live-pause television program viewing from digital television program data recorded on a storage device, reduces channel change delay when changing digital television channels. The digital video storage device processes and stores video data from a digital television channel to which a channel change expected (predicted) concurrent with storing video data from a digital television channel that is currently selected. The digital video storage device substantially simultaneously reads the stored video data for the currently selected digital television channel and the predicted digital television channel, and decodes the video data of the currently selected digital television channel for presentation to a Decoding display associated with the digital video storage device. Upon receipt of a channel change request for the predicted digital television channel, the digital video storage device starts decoding the read video data of the predicted digital television channel for presentation to the display.

4 Claims, 3 Drawing Sheets

(56) References Cited

U.S. PATENT DOCUMENTS

| | | |
|---|---|---|
| 6,804,824 B1 * 10/2004 | Potrebic et al. | 725/38 |
| 6,985,188 B1 1/2006 | Hurst, Jr. | |
| 7,142,255 B2 * 11/2006 | Nohrden | 348/725 |
| 2002/0194600 A1 12/2002 | Ellis et al. | |
| 2003/0063893 A1 4/2003 | Read | |
| 2003/0159157 A1 8/2003 | Chan | |
| 2004/0001500 A1 * 1/2004 | Castillo | 370/437 |
| 2004/0120693 A1 6/2004 | Kawai | |
| 2004/0181813 A1 * 9/2004 | Ota et al. | 725/131 |
| 2005/0094733 A1 5/2005 | Daniell | |
| 2006/0085828 A1 * 4/2006 | Dureau et al. | 725/100 |
| 2006/0123460 A1 6/2006 | Okada et al. | |

FOREIGN PATENT DOCUMENTS

| | | |
|---|---|---|
| FR | 2754384 | 4/1998 |
| GB | 9001523 | 4/1991 |
| JP | 4-117782 | 4/1992 |
| JP | 10/004524 | 1/1998 |
| JP | 11/146289 | 5/1999 |
| JP | 11146289 | 5/1999 |
| JP | 11-168357 | 6/1999 |
| JP | 2001/008144 | 1/2001 |
| JP | 2001/204035 | 7/2001 |
| JP | 2001/275090 | 10/2001 |
| JP | 2002/112138 | 4/2002 |
| JP | 2002/152648 | 5/2002 |
| JP | 2002/374487 | 12/2002 |
| JP | 20030059559 | 7/2003 |
| JP | 2005/110117 | 4/2005 |
| KR | 2003-0059559 | 7/2003 |
| KR | 2004-0063381 | 7/2004 |
| WO | WO 00/64050 | 10/2000 |
| WO | WO 2005/020564 | 3/2005 |

* cited by examiner

FAST CHANNEL CHANGE IN A DIGITAL TELEVISION RECEIVER

This application claims the benefit, under 35 U.S.C. §365 of International Application PCT/US2006/003187 filed Jan. 27, 2006, which was published in accordance with PCT Article 21(2) on Aug. 2, 2007 in English.

TECHNICAL FIELD

The present invention concerns digital television devices and, in particular, concerns a manner of providing fast channel change in a digital television receiver.

BACKGROUND ART

A digital television or video receiver such as a television, set top box or the like has inherently long channel change times due to the complexity of the television signal. Particularly, digital television signals are compressed in order to eliminate redundancies from line to line and from frame to frame in the television images. The compression technology utilized in digital television systems makes the incoming television signal difficult to decode and display.

The incoming digital television signal must undergo extensive processing before it can be provided for display. At the least, the digital television signal must undergo tuning, demodulation and decoding before it is encoded for presentation on a display device. Thus, while the complex encoding scheme for digital television signals produces a high quality television picture, the complex encoding scheme also causes a delay in the reproduction of a video signal. Since a change in channel requires the digital television signal to undergo the same tuning, demodulation and decoding procedure, there is a consequent delay in providing the video signal after a channel change request.

Recently, devices known as digital video storage devices or personal video recorders have been introduced. Personal Video Recorder (PVR) is a generic term for a device that records television data in digital format in a storage medium, such as a memory or hard disk drive, and may also be referred to as a hard disk recorder (HDR), digital video recorder (DVR), personal video station (PVS) or personal TV receiver (PTR). Digital video storage devices utilize the storage medium to record and store television programming as selected by the user. Because of its design, the PVR provides a number of features and functions. One such feature is known as live-pause. Live-pause allows the user to pause live television programming. Live-pause, however, requires the digital bitstream to be stored, read and decoded before viewing, even for a live program. Therefore, it can be seen that a hard drive based digital video recorder adds delays since the viewed program is always previously recorded data in order to make the live-pause feature possible. This adds additional delay to a channel change time.

Despite the increasing availability of on-screen program or channel guides, channel surfing continues to be the method of choice for viewers. A one-quarter to one-half second delay during each channel change makes channel surfing tedious.

It can therefore be appreciated from the above that there is a need to provide for faster channel change in a digital video apparatus.

SUMMARY OF THE INVENTION

According to the principles of the present invention, a digital video signal processing system provides a reduction in channel change delay, particularly when viewing live television programming from a storage device of the digital television receiver.

In one embodiment, a method of operation of a digital video storage device, a multi-tuner digital video storage device concurrently acquires, stores and reads video data of a currently selected digital television channel of a digital television signal and video data of a predicted digital television channel. The video data of the currently selected digital television channel is decoded and provided for presentation on a display associated with the digital video storage device. Upon receipt of a channel change request for the predicted digital television channel, the digital video storage device starts decoding the read video data of the predicted digital television channel for presentation to the display.

BRIEF DESCRIPTION OF THE DRAWINGS

The above mentioned and other features and objects of this invention, and the manner of attaining them, will become more apparent and the invention itself will be better understood by reference to the following description of an embodiment of the invention taken in conjunction with the accompanying drawings, wherein.

Corresponding reference characters indicate corresponding parts throughout the several views.

DETAILED DESCRIPTION OF THE PREFERRED EMBODIMENT

A digital video receiving and recording system having a digital video receiving and recording apparatus according to an embodiment of the invention will be described with reference to the drawings.

Figure 1:
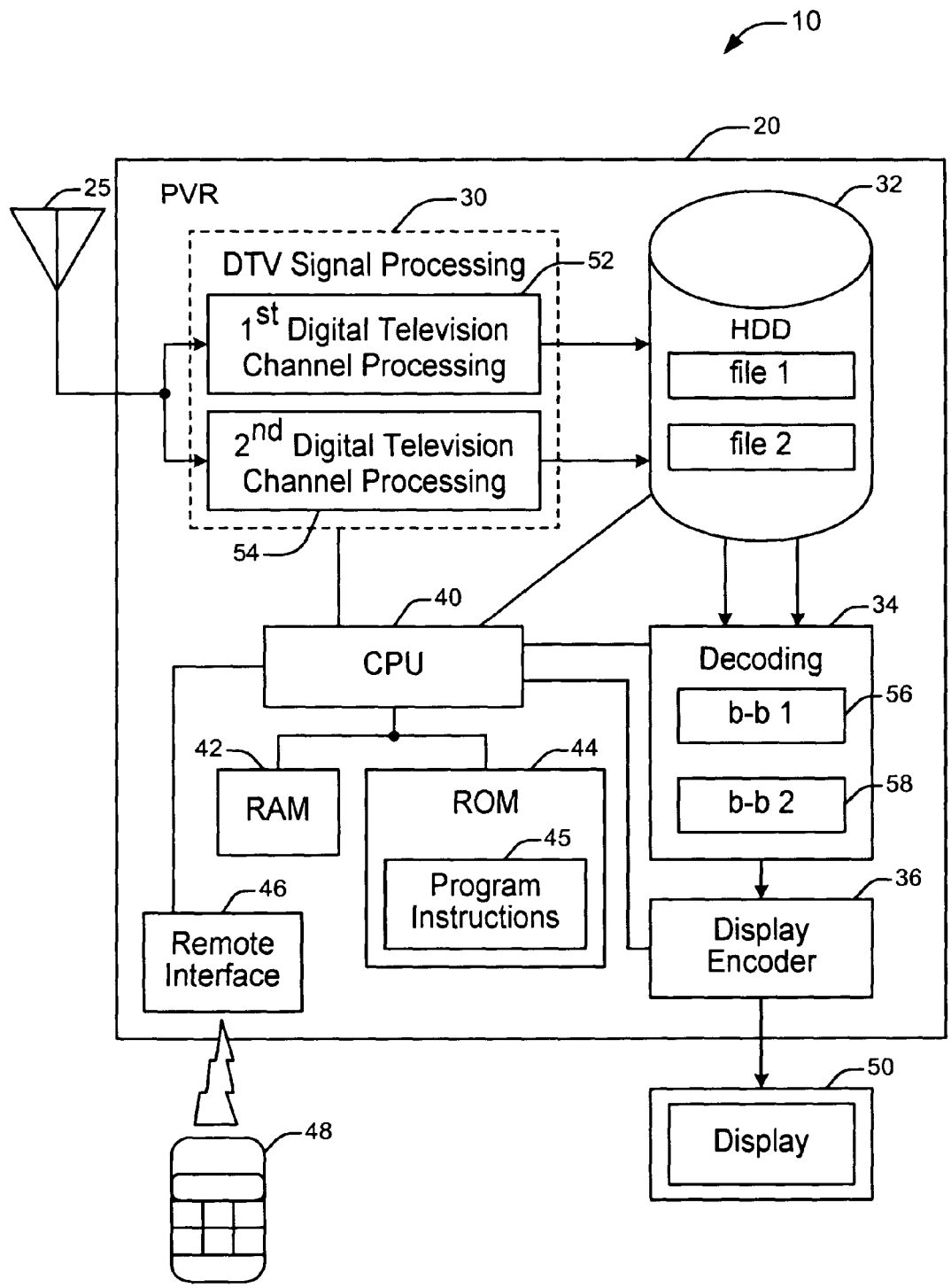
FIG. 1 is a block diagram of an exemplary digital video storage device according to the principles of the present invention.

FIG. 1 is a representation of a digital television system 10 having a digital television signal receiver, here embodied as a personal video recorder (PVR) 20. Those skilled in the art will appreciate that the block diagram of FIG. 1 should be considered conceptual and may not represent the physical arrangement of functional blocks in an actual PVR. However, the block diagram of PVR 20 provides a functional illustration at a high level for understanding the operation of the PVR in accordance with the principles of the present invention.

The PVR 20 includes a digital television (DTV) signal processing section 30, a digital storage device 32 (here embodied as a hard disk drive (HDD)), a decoding section 34, a display encoder 36 and a CPU (central processing unit, control section, controller or the like) 40. The CPU 40 is coupled with, connected to and/or in communication with the DTV signal processing section 30, the HDD 32, the decoding section 34 and the display encoder 36 and is configured for providing control of the various components of the PVR 20. RAM 42 and ROM 44 are coupled to and in communication with the CPU 40, the ROM 44 storing program instructions, programming or the like 45 for the PVR for performing the functions, features, functionality and/or control of the PVR 20, CPU 40 and/or the other components of the PVR as described herein.

The DTV signal processing section 30 is connected to a digital television signal source, here represented by an antenna 25. The antenna 25 is configured to receive terrestrially broadcast digital television signals of a plurality of digital television channels. It should be appreciated, however, that the PVR 20 may be connected to other DTV signal sources such as satellite and cable systems, and to more than one DTV signal source.

The DTV signal processing section 30 is operable, configured and/or adapted to receive a DTV signal from the antenna 25 and process the DTV signal to acquire a DTV television channel and extract or obtain video data, audio data and program data (digital television channel data) in the form of digital bitstreams from and/or for the acquired DTV television channel. The extracted digital television channel video data and audio data is stored or recorded in the HDD 32 and decoded by the decoding section 34. The video data is formatted for display as appropriate via the display encoder 36 and provided to the display 50. The CPU 40 provides control of the various components as indicated above.

In this embodiment, the DTV signal processing section 30 has first digital television channel processing 52 and second digital television channel processing 54 each of which are separately operable, configured and/or adapted to receive the DTV signal and process the DTV signal to acquire a DTV television channel and extract or obtain video data, audio data and program data (digital television channel data) in the form of digital bitstreams from and/or for the acquired DTV television channel.

The DTV signal processing section 30 and thus the first and second digital television channel processing sections 52, 54 are under the control of the CPU 40 according to the program instructions 45. The CPU is operable, configured and/or adapted to received channel change or channel input commands (as well as other user input and/or commands), requests and/or signals from a remote control device 48 (user input device) via a remote interface 46. One digital television channel processing section (for example and arbitrarily, digital television channel processing section 52) is caused to acquire a selected digital television channel (a currently selected digital television channel). The selected digital television channel is a channel selected for current viewing by the user. The digital television channel processing section 52 extracts or obtains digital television channel video data, audio data and program data (current digital television channel data) in the form of digital bitstreams from and/or for the acquired DTV television channel. At least the current digital television channel video bitstream (data) and the current digital television channel audio bitstream (data) is recorded (stored) in the HDD 32.

Figure 2:
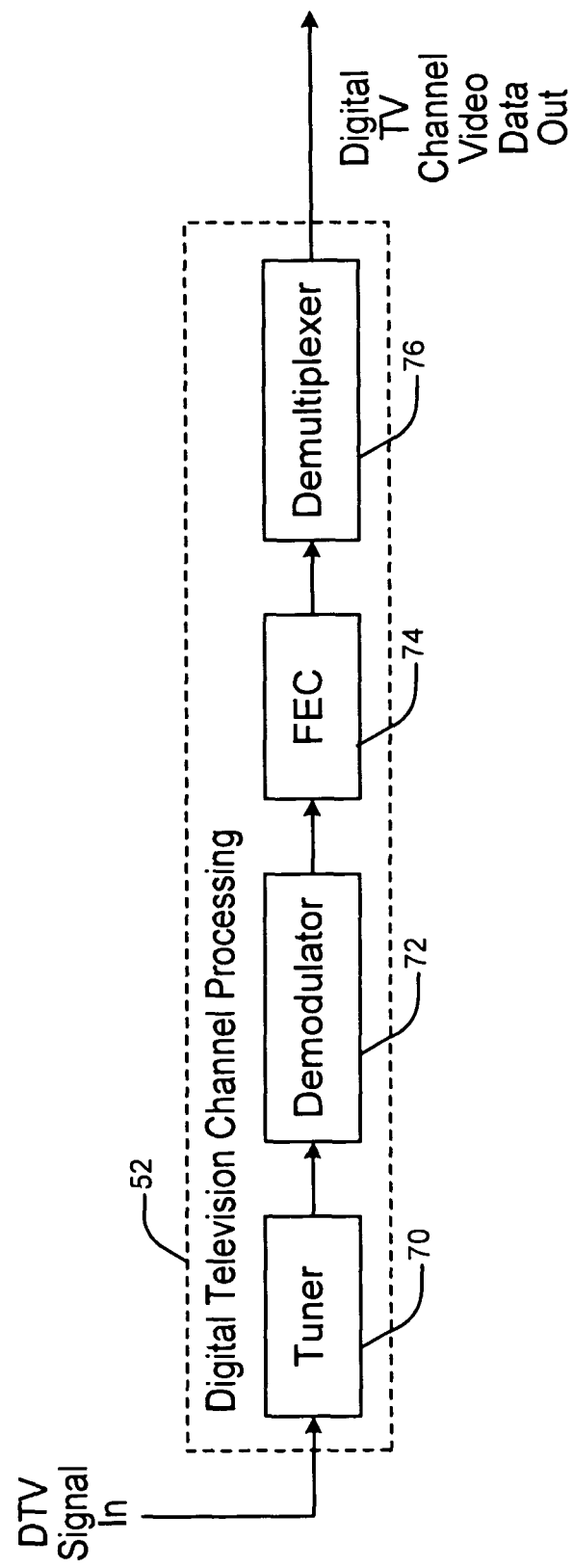
FIG. 2 is a block diagram of an exemplary digital television channel processor of the exemplary digital video storage device of FIG. 1.

Referring additionally to FIG. 2, an exemplary structure of the digital television channel processing section 52 of the DTV signal processing section 30 is shown. The digital television channel processing section 52 includes a tuner/tuning section 70. The tuner 70 is connected to a source of digital television signals and extracts (tunes to) and amplifies a selected digital television channel from the plurality of DTV channels. The tuner 70 outputs the digital television channel signal to a digital demodulator/demodulator section 72. In the demodulator 72, the digital television channel signal is converted into digital data representing video data, audio data and program information. This digital data is output to an error correction section 74 (here a forward error correction, FEC, section) that corrects errors in transmission on the receiving end. The FEC 74 outputs the error corrected digital television channel data to a demultiplexer 76. The demultiplexer 76 separates the inputted digital television channel data into a digital video signal (bitstream or data), a digital audio signal (bitstream or data) and program information for or of the digital television channel.

Referring back to FIG. 1, the digital current television channel video data and the digital current television channel audio data are recorded or stored in/on the storage device (HDD) 32. Particular, the video and audio data is stored in a first file (file 1) on the HDD 32. The video and audio data are read from the HDD 32 and provided to a decoding section 34. Particularly, the video data is continuously read into (provided to) a first bit-buffer (b-b 1) of the decoding section 34. The decoding section is operable, configured and/or adapted to decode the digital video data. The decoding section may be an MPEG decoder. The decoded video data is then provided to a display encoder 36 that formats the video data appropriately for presentation to the display 50. Alternatively, video buffers may be used to store the video data rather than on the hard drive. The video buffers may be implemented via DRAM that would be in communication with the DTV signal processing section 30 and the decoding section 34.

The second digital television processing circuit 54 is operable, under the control of the CPU 40 and the program instructions 45, to acquire and process another digital television channel in like manner as the first digital television processing circuit 52. In accordance with an aspect of the present invention, the second digital television processing circuit 54 is caused to acquire and process a predicted digital television channel. The predicted digital television channel is a non-currently tuned digital television channel that the user is expected to tune to as a next channel. Various channel prediction algorithms may be used. For example, some possibilities include the assumption that the next channel to be selected (via a channel change command, signal or request) will be (is) the next channel in an up direction in a scan list, the assumption that the next channel to be selected will be the next channel in a down direction in the scan list, the assumption that the next channel to be selected will be the previous channel before the currently tuned channel, and the assumption that the next channel to be selected will be the most frequently watched channel. Thus, while one digital television channel processing section (e.g. 52) is tuned to a current television channel, the second digital television processing section (e.g. 54) tunes to a predicted television channel.

The digital predicted television channel video data and the digital predicted television channel audio data from the second digital television channel processing section 54 are recorded or stored in/on the storage device (HDD) 32. Particular, the predicted video and audio data is stored in a second file (file 2) on the HDD 32. The predicted video and audio data are then read concurrent and/or simultaneous with the reading of the current video and audio data, from the HDD 32 and continuously read into (provided to) a second bit-buffer (b-b 2) of the decoding section 34.

In this embodiment, while the video data for both the current digital television channel and the predicted digital television channel continuously fill the bit-buffers (buffers) for decoding thereof, only the video data for the current digital television channel is decoded and thus is provided to the display 50 for viewing. If a channel change command or request is received whose digital television channel matches the digital television channel of the predicted digital television channel, the decoder 34 decodes the predicted digital television channel video data rather than the current digital television channel video data. If the predicted video data is then provided to the display 50, the digital television channel corresponding to the predicted digital television channel becomes the current digital television channel and the processing section (52, 54) not providing the now current digital television channel is used to tune to a next predicted digital television channel. In the case where a channel change does not correspond to the predicted digital television channel, either the first and second tuner (digital television signal processing) may be used to acquire the selected digital television channel. The other of the processing then acquires a predicted digital television channel.

Alternatively, the decoding section 34 may be configured, operable and/or adapted to decode video data from the current television channel bitstream and from the predicted television channel bitstream rather than from just one. In this case, the video data from each of the digital television channels is processed to the point of being display encoded. Of course, video data from only one of the two video bitstreams (current and predicted) is provided to the display encoder 36 for presentation on the display 50.

Figure 3:
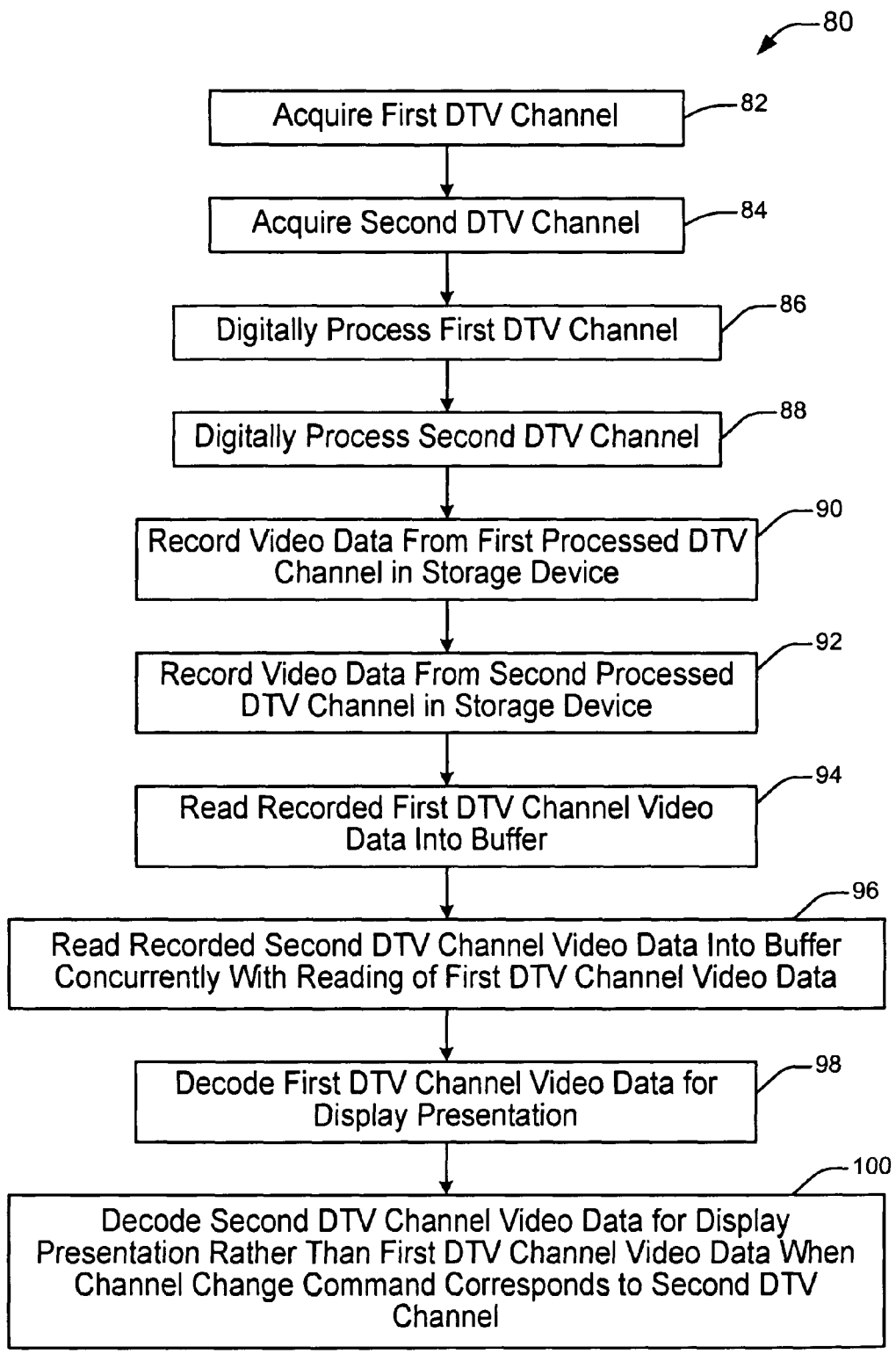
FIG. 3 is a flowchart of an exemplary manner of operation of a digital video storage device in accordance with the present principles.

Reference is now made to FIG. 3. FIG. 3 depicts a flowchart, generally designated 80, of a manner of operation of a digital video receiver (e.g. PVR) in accordance with the principles of the present invention as described herein. It should be appreciated that each block or box of the flowchart 80 represents a step or function implemented by the PVR. Also, it should be appreciated that subsets (particular or selected blocks or steps) of the manner of operation illustratively depicted and described herein with respect to flowchart 80 also constitute manners of operation. As well, the order of the blocks or steps may not necessarily correspond with the order of execution of the various steps within or by the PVR.

In step 82, the PVR acquires a first digital television channel from a digital television signal (containing a plurality of digital television channels). In step 84, the PVR acquires a second digital television channel from the digital television signal. The first digital television channel is processed in step 86. Processing of the first digital television channel includes extracting the video signal, data or bitstream from the DTV channel. The second digital television channel is processed in step 88. Processing of the second digital television channel includes extracting the video signal, data or bitstream from the DTV channel.

In step 90, the video data (first video data) obtained by processing the first DTV channel is recorded or stored by the PVR, such as in a HDD. The first video data is recorded in a first video data file. In step 92, the video data (second video data) obtained by processing the second DTV channel is recorded or stored by the PVR, such as in a HDD. The second video data is recorded in a first video data file.

In step 94, the recorded first video data is read from the storage device and into a first buffer. In step 96, the recorded second video data is read from the storage device and into a second buffer substantially concurrent, simultaneous or interleaved with the reading of the first video data into the first buffer such that each video bitstream substantially continuously fills the buffer.

The first video data is then, in step 98, decoded from the buffer for presentation to a display device. In step 100, the second video data is decoded from the buffer for display presentation rather than the decoding of the first video data, when a channel change command, request or signal is received and the requested DTV channel is the same as, corresponds to or matches the second DTV channel. As indicated above, alternatively a dual decoder may process each video bitstream from the buffer and then selectively provide their output to a video encoder for display presentation.

Also, it should be appreciated that the DTV signal processing and/or processor section 30 may include more than two digital television channel processing sections or circuitry/logic to tune, acquire, obtain and/or process more than two digital television channels from one or more DTV signals in the manner described herein. As such, each tuner (digital television processor) not tuned to a current digital television channel not used for another purpose (in like manner to the use or non-use of the second digital television channel processing 54) is tuned to a predicted television channel. Each predicted digital television channel's data is recorded or stored in a separate file in the storage device. Additional decoding buffers may be provided for each predicted digital television channel as well as decoders if desired. Such multi-tuning/processing devices allow for additional functionality for enabling faster channel change.

In particular, a further application may be provided in a multi-DTV signal processing device (i.e. a DTV device having three or more tuners/processors ("tuners")). In this further application, tuner 1 is used to receive a currently watched digital television channel. Tuner 2 is used to acquire and buffer the video stream from a predicted next channel. Tuner 3 is used to scan all of the digital television channels to locate an I-frame in the MPEG bitstream for each digital television channel. The located I-frame for each channel is provided to and stored in a buffer (DRAM), hard drive or other digital storage device as a thumbnail image to populate an on-screen guide. The thumbnails (obtaining of an I-frame for each digital television channel) may be refreshed as necessary, such as after a channel change or a given amount of time elapsed after a last thumbnail update.

While this invention has been described as having a preferred design, the present invention can be further modified within the spirit and scope of this disclosure. For example, although explained in the context of processing multiple DTV channels substantially simultaneously, the invention is also applicable to processing multiple digital video sources simultaneously. More specifically, the described system could process and store a signal from a currently selected digital video signal source while also substantially simultaneously processing and storing a digital video signal from a second or predicted video signal source. This application is therefore intended to cover any variations, uses, of adaptations of the invention using its general principles. Further, this application is intended to cover such departures from the present disclosure as come within known or customary practice in the art to which this invention pertains and that fall within the limits of the appended claims.

The invention claimed is:

1. A method comprising the steps of:
recording digital video bitstream of a currently selected digital video source;
predicting a predicted next video program to be selected;
recording a digital video bitstream of a predicted video source in response to said predicted next video program to be selected;
reading and decoding said recorded digital video bitstream of said currently selected digital video source for output to a display;
reading said recorded digital video bitstream of said predicted digital video source for simultaneously decoding with said reading of said recorded digital bitstream of said currently selected digital video source; and
decoding said read recorded digital video bitstream of said predicted digital video source for representing to a display when a digital video source change request corresponds to said predicted digital video source, wherein said recorded currently selected digital video bitstream is read into a first bit-buffer for decoding, said recorded predicted digital video bitstream is read into a second bit-buffer simultaneously with said reading of said recorded currently selected digital for said presentation when said request is received.

2. The method of claim 1, wherein
said digital video bitstream of said currently selected digital video source is recorded in a first file on a hard drive, and
said digital video bitstream of said predicted digital video source is recorded in a second file on said hard drive.

3. An apparatus comprising:
a first digital television signal processing module operative to receive a first digital video bitstream from a first digital video source;
a second digital television signal processing module operative to receive a second digital video bitstream from a second digital video source;
a data storage device coupled to said first and second digital television signal processing modules;
a decoder configured to decode a digital video bitstream;
a controller coupled to said data storage device, said decoder, and said first and second digital television signal processing modules, said controller operative to cause said digital video storage device to:
store said first and second digital video bitstream on said data storage device;
read said first digital video bitstream out of said data storage device;
decode said read first digital video bitstream until a video source change request is received;
read said second digital video bitstream out of said data storage device simultaneously with said reading of said first digital video bitstream;
decode said read second digital video bitstream when a received video source change request corresponds to said second digital video source;
read said recorded first digital video bitstream into a first bit-buffer for decoding;
read said second digital video bitstream into a second bit-buffer simultaneously with said reading of said recorded first digital video bitstream for presenting to a display when said request is received.

4. The apparatus of claim 3, wherein
said controller further operative to cause said digital video storage device to:
record said first digital video bitstream in a first file on said storage device; and
record said second digital video bitstream in a second file on said storage device.

* * * * *